(12) United States Patent
   Stafford (10) Patent No.: US 9,729,864 B2
(45) Date of Patent: Aug. 8, 2017

(54) CAMERA BASED SAFETY MECHANISMS FOR USERS OF HEAD MOUNTED DISPLAYS

(71) Applicant: Sony Interactive Entertainment Inc., Tokyo OT (JP)

(72) Inventor: Jeffrey Roger Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 343 days.

(21) Appl. No.: 14/170,470

(22) Filed: Jan. 31, 2014

(65) Prior Publication Data

US 2015/0092015 A1    Apr. 2, 2015

Related U.S. Application Data

(60) Provisional application No. 61/884,900, filed on Sep. 30, 2013.

(51) Int. Cl.
   *H04N 13/04* (2006.01)
   *H04N 13/02* (2006.01)
   (Continued)

(52) U.S. Cl.
   CPC ....... *H04N 13/0429* (2013.01); *A63F 13/213* (2014.09); *A63F 13/5255* (2014.09);
   (Continued)

(58) Field of Classification Search
   None
   See application file for complete search history.

(56) References Cited

U.S. PATENT DOCUMENTS

| 7,677,734 B2 | 3/2010 | Wallace |
| 2001/0040590 A1 | 11/2001 | Abbott et al. |

(Continued)

FOREIGN PATENT DOCUMENTS

| WO | WO2012/101720 A1 | 8/2012 | ............... G06F 3/01 |
| WO | WO 2012101720 A1 | 8/2012 | |

(Continued)

OTHER PUBLICATIONS

Partial International Search Report, PCT/US2014/055715, pp. 1-2, Jul. 1992; reprint Jan. 2004.

(Continued)

*Primary Examiner* — Frederick Bailey
(74) *Attorney, Agent, or Firm* — Martine Penilla Group, LLP (57) ABSTRACT

The disclosure provides methods and systems for warning a user of a head mounted display that the user approaches an edge of field of view of a camera or one or more tangible obstacles. The warning includes presenting audio and/or displayable messages to the user, or moving the display(s) of the head mounted displays away of the user's eyes. The determination that the user approaches the edge of scene or a tangible obstacle is made by dynamically tracking motions of the users through analysis of images and/or depth data obtained from image sensor(s) and/or depth sensor(s) secured to either the head mounted display, arranged outside of the scene and not secured to the head mounted display, or a combination of both.

20 Claims, 6 Drawing Sheets

(51) Int. Cl.
*G02B 27/01* (2006.01)
*A63F 13/213* (2014.01)
*A63F 13/5255* (2014.01)
*G06F 3/01* (2006.01)

(52) U.S. Cl.
CPC ........... *G02B 27/017* (2013.01); *G06F 3/017* (2013.01); *H04N 13/025* (2013.01); *G02B 2027/0178* (2013.01); *G02B 2027/0187* (2013.01); *G06F 2203/012* (2013.01)

(56) References Cited

U.S. PATENT DOCUMENTS

| | | | |
|---|---|---|---|
| 2003/0234823 A1* | 12/2003 | Sato | G06F 3/013 715/848 |
| 2005/0168569 A1 | 8/2005 | Igarashi et al. | |
| 2005/0195277 A1 | 9/2005 | Yamasaki | |
| 2007/0297687 A1 | 12/2007 | Yamasaki | |
| 2008/0051946 A1 | 2/2008 | Breed | |
| 2008/0278821 A1 | 11/2008 | Rieger | |
| 2010/0142826 A1* | 6/2010 | Kotake | G06T 7/75 382/203 |
| 2010/0245387 A1* | 9/2010 | Bachelder | G06T 19/006 345/633 |
| 2011/0214082 A1 | 9/2011 | Osterhout et al. | |
| 2011/0230263 A1 | 9/2011 | Ng | |
| 2011/0261052 A1* | 10/2011 | Shefi | G06T 19/20 345/419 |
| 2012/0154557 A1* | 6/2012 | Perez | H04N 21/25891 348/53 |
| 2012/0194554 A1 | 8/2012 | Kaino et al. | |
| 2012/0206485 A1 | 8/2012 | Osterhout et al. | |
| 2012/0212414 A1 | 8/2012 | Osterhout et al. | |
| 2012/0235900 A1 | 9/2012 | Border et al. | |
| 2013/0021373 A1 | 1/2013 | Vaught et al. | |
| 2013/0093788 A1 | 4/2013 | Liu et al. | |
| 2013/0095924 A1 | 4/2013 | Geisner et al. | |
| 2013/0127980 A1 | 5/2013 | Haddick et al. | |
| 2013/0128012 A1* | 5/2013 | Turner | G06F 3/011 348/53 |
| 2013/0141434 A1* | 6/2013 | Sugden | G02B 27/017 345/426 |
| 2013/0278631 A1 | 10/2013 | Border et al. | |
| 2013/0293530 A1* | 11/2013 | Perez | G06T 19/006 345/418 |
| 2013/0293586 A1 | 11/2013 | Kaino et al. | |
| 2013/0314303 A1 | 11/2013 | Osterhout et al. | |
| 2014/0002442 A1* | 1/2014 | Lamb | G06F 3/1431 345/419 |
| 2014/0002495 A1* | 1/2014 | Lamb | G06F 3/1431 345/633 |
| 2014/0049560 A1* | 2/2014 | Campbell | G06T 11/60 345/633 |
| 2014/0142757 A1 | 5/2014 | Ziegler et al. | |
| 2014/0192084 A1 | 7/2014 | Latta et al. | |
| 2015/0193977 A1* | 7/2015 | Johnson | G06T 19/006 345/419 |
| 2015/0205484 A1* | 7/2015 | Morishita | G06F 3/012 382/103 |
| 2015/0248826 A1 | 9/2015 | Hahn et al. | |
| 2016/0018897 A1* | 1/2016 | Nagai | G02B 27/017 345/156 |
| 2016/0021353 A1* | 1/2016 | Lundberg | H04N 13/0239 348/54 |

FOREIGN PATENT DOCUMENTS

| | | | | |
|---|---|---|---|---|
| WO | WO2013/052855 A2 | 4/2013 | ............ | G02B 27/02 |
| WO | WO 2013052855 A2 | 4/2013 | | |

OTHER PUBLICATIONS

Williams et al., "*Exploring Large Virtual Environments with an HMD when Physical Space is Limited*", XP-001510324, Symp. on Applied Perception in Graphics and Visualization, ACM, NY, pp. 41-48, Proc. Jul. 25, 2007.

Turchet, et al., "*Inside the Boundaries of the Physical World: Audio-Haptic Feedback as Support for the Navigation in Virtual Environments*", Jun. 13, 2012, Haptics: Perception, Devices, Mobility, and Communication, Springer Berlin Heidelberg, Berlin, pp. 577-588, XP047010369, ISBN: 978-3-642-31400-1.

Steinicke et al., "*Estimation of Detection Thresholds for Redirected Walking Techniques*", IEEE Transactions on Visualization and Computer Graphics, IEEE Service Center, Los Alamitos, CA, vol. 16, No. 1, Jan. 1, 2010, pp. 17-27, XP011344590, ISSN: 1077-2626, DOI: 10.1109/TVCG.2009.62.

Cirio et al., "*Walking in a Cube: Novel Metaphors for Safely Navigating Large Virtual Environments in Restricted Real Workspaces*", IEEE Transations on Visualization and Computer Graphics, IEEE Service Center, Los Alamitos, CA, vol. 18, No. 4, Apr. 1, 2012, pp. 546-554, XP011490408, ISSN: 1077-2626, DOI: 10.1109/TVCG.2012.60.

Partial International Search Report, PCT/US2014/057041, pp. 1-5, Feb. 10, 2015.

\* cited by examiner

CAMERA BASED SAFETY MECHANISMS FOR USERS OF HEAD MOUNTED DISPLAYS

CROSS REFERENCE TO RELATED APPLICATIONS

This application claims the priority benefit of U.S. provisional application No. 61/884,900, filed Sep. 30, 2013, and titled "Camera Based Safety Mechanisms for Users of Head Mounted Displays." The above-reference application is hereby incorporated by reference in its entirety.

TECHNICAL FIELD

This disclosure relates generally to human-computer interfaces, more particularly, to warning users when they move outside of a camera's field of view or when they approach one or more tangible obstacles.

DESCRIPTION OF RELATED ART

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

One of the rapidly growing technologies in the field of human-computer interaction is various head-mounted or head-coupled displays, which can be worn on a user head and which have one or two displays in front of the one or two user eyes. This type of displays has multiple civilian and commercial applications involving simulation of virtual reality including video games, medicine, sport training, entertainment applications, and so forth. In the gaming field, these displays can be used, for example, to render three-dimensional (3D) virtual game worlds. The important aspect of these displays is that the user is able to change a displayable view within the virtual world by turning his head, rather than utilizing a traditional input device such as a keyboard or a trackball.

However, in traditional head-mounted displays, the users are vulnerable to get injuries when they wear the head mounted display and make motions or move towards tangible obstacles such as a coffee table, chair, etc. In addition, in some human-computer interfaces involving head-mounted displays, the user shall be present within the field of view of a dedicated video camera or depth sensor. It may be annoying for the user when the human-computer interaction is interrupted if the user moves out of the field of view.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure refers to the technology for warning the users of head mounted displays that they approach an edge of field of view of a camera or that they approach one or more tangible obstacles. The warning includes presenting audio and/or displayable messages to the user, or moving the display(s) of the head mounted displays away of the user's eyes. The determination that the user approaches the edge of scene or a tangible obstacle is made by dynamically tracking motions of the users through analysis of images and/or depth data obtained from image sensor(s) and/or depth sensor(s) secured to either the head mounted display, arranged outside of the scene and not secured to the head mounted display, or a combination of both.

According to one aspect of the embodiments disclosed herein, provided is a method for cautioning a user of a head mounted display. The method includes receiving, by a processor, images of a scene within which the user using the head mounted display is present. The scene includes a predetermined three-dimensional area. The method further includes tracking, by the processor, location information of the user based at least in part on the images. The method further includes dynamically determining, by the processor, that the user approaches an edge of the scene. Further, based on the determination, the method includes warning, by the processor, the user that the user approaches the edge of the scene.

In certain embodiments, the warning includes playing, by the processor, an audio message. The warning also includes sending, by the processor, a displayable message to the head mounted display for displaying. The warning also includes graduate fading, by the processor, brightness of images displayable by the head mounted display to the user. The fading of the brightness may be stronger, the closer the user approaches the edge of the scene. The warning includes stopping, by the processor, displaying images by the head mounted display. The warning also includes moving, by the processor, at least one display of the head mounted display away from eyes of the user. The edge of the scene includes a tangible obstacle. The images further include depth information of the scene. The scene can be defined by a field of view of at least one image sensor or at least one depth sensor. The warning includes directing, by the processor, the user back towards a center of the scene.

According to one another aspect of the embodiments disclosed herein, provided is a method for cautioning a user of a head mounted display. The method includes receiving, by a processor, images of a scene wherein the images are captured by one or more sensors secured to the head mounted display. The method further includes dynamically determining, by the processor, that the user approaches towards one or more tangible obstacles based at least on the images. The method further includes warning, by the processor and based on the determination, the user that the user approaches the one or more obstacles.

In certain embodiments, the one or more sensors include an image sensor. In other embodiments, the one or more sensors include a depth sensor. The images include depth information of the scene. In certain embodiments, the method further includes receiving, by the processor, secondary images of the scene from one or more secondary sensors arranged outside of the scene and not secured to the head mounted display. The determining that the user approaches towards one or more tangible obstacles is further based at least on the secondary images. In certain embodiments, the one or more tangible obstacles are present within the scene. In some embodiments, the one or more tangible obstacles include an edge of the scene.

According to yet another aspect of the embodiments disclosed herein, provided is a method for cautioning a user of a head mounted display. The method includes receiving, by a processor, depth data of a scene wherein the images are captured by one or more depth sensors secured to the head mounted display. The method further includes dynamically determining, by the processor, that the user approaches towards one or more tangible obstacles based at least on the depth data. The method further includes warning, by the processor and based on the determination, the user that the user approaches the one or more obstacles.

In further embodiments, the method steps are stored on a machine-readable medium comprising instructions, which when implemented by one or more processors perform the steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a mobile terminal, cellular phone, smart phone, computer (e.g., a desktop computer, tablet computer, laptop computer), game console, handheld gaming device, and so forth.

In general, the embodiments of the present disclosure provides methods and systems for warning users of head mounted displays that approach an edge of a scene or move outside a field of view of a camera, or when they move towards one or more tangible obstacles. The determination that the users approach the field of view edge or the obstacles is made based on analysis of images and/or depth data. The images and/or depth data can be obtained from image sensor(s) and/or depth sensor(s) arranged either on the head mounted display or apart from the user and not being connected to the head mounted display, or a combination of both. The warning includes audio messages, displayable or visible messages, highlighting of LEDs, graduate fading of the displayable images on the head mounted display, fading of the images' brightness, blending in the real world view, causing the head mounted display to vibrate, disengaging the head mounted display or its parts, or moving display(s) of the head mounted display away from the user's eyes so the user could see the real world and obstacles where he moves.

The term "head mounted display," as used herein, refers to one or more of the following: a wearable computer having a display, head mounted electronic device, a head-coupled display, a helmet-mounted display, a head-mounted computer with a display. The head mounted device, which his worn on a head of a user or which is a part of a helmet, has a small display optic in front of one (monocular display device) or each eye (binocular display device). The head mounted device has either one or two small displays with lenses and semi-transparent mirrors embedded in a helmet, eye-glasses (also known as data glasses) or visor. The display units can be miniaturized and may include a Liquid Crystal Display (LCD), Organic Light-Emitting Diode (OLED) display, or the like. Some vendors employ multiple micro-displays to increase total resolution and field of view. Some other head mounted devices do not use a traditional display at all and instead project light directly into the user's eyes.

The term "depth sensor," as used herein, refers to any suitable electronic device capable to generate depth maps of a 3D space. Some examples of the depth sensitive device include a depth sensitive camera, stereo 3D camera, depth sensor, video camera configured to process images to generate depth maps, and so forth. The depth maps can be processed by a control device to locate a user present within a 3D space and also its body parts including a user head, torso and limbs. The term "image sensor," as used herein, refers to any suitable electronic device capable to generate still or motion images of the 3D scene. Some examples of image sensors include a video camera, photo camera, charge-coupled device (CCD), and so forth. The term "field of view," as used herein, refers to the extent of 3D space covered and "viewed" by the image sensor and/or depth sensor.

The term "control device," as used herein, refers to any suitable computing apparatus or system configured to process data, images, depth maps, user inputs, and so forth. Some examples of control device include a desktop computer, laptop computer, tablet computer, gaming console, audio system, video system, cellular phone, smart phone, set-top box, television set, and so forth. In certain embodiments, at least some elements of the control device are incorporated into the display device (e.g., in a form of head-wearable computer). The control device can be in a wireless or wired communication with a depth sensor/image sensor and a head mounted display. The control device is also responsible for generating images displayable further on the head mounted display (e.g., generate a virtual reality). In certain embodiments, the term "control device" refers to a "computing device," "processing means" or merely a "processor".

According to embodiments of the present disclosure, a head mounted display can be worn by a user within a particular 3D space such as a living room of premises. The user can be present in front of a depth sensor/image sensor which track user's motions. The control device processes data received from the depth sensor/image sensor and, by the result of the processing, the control device identifies the user, user's motions/gestures, and track coordinates of the virtual skeleton within the 3D space.

Figure 1:
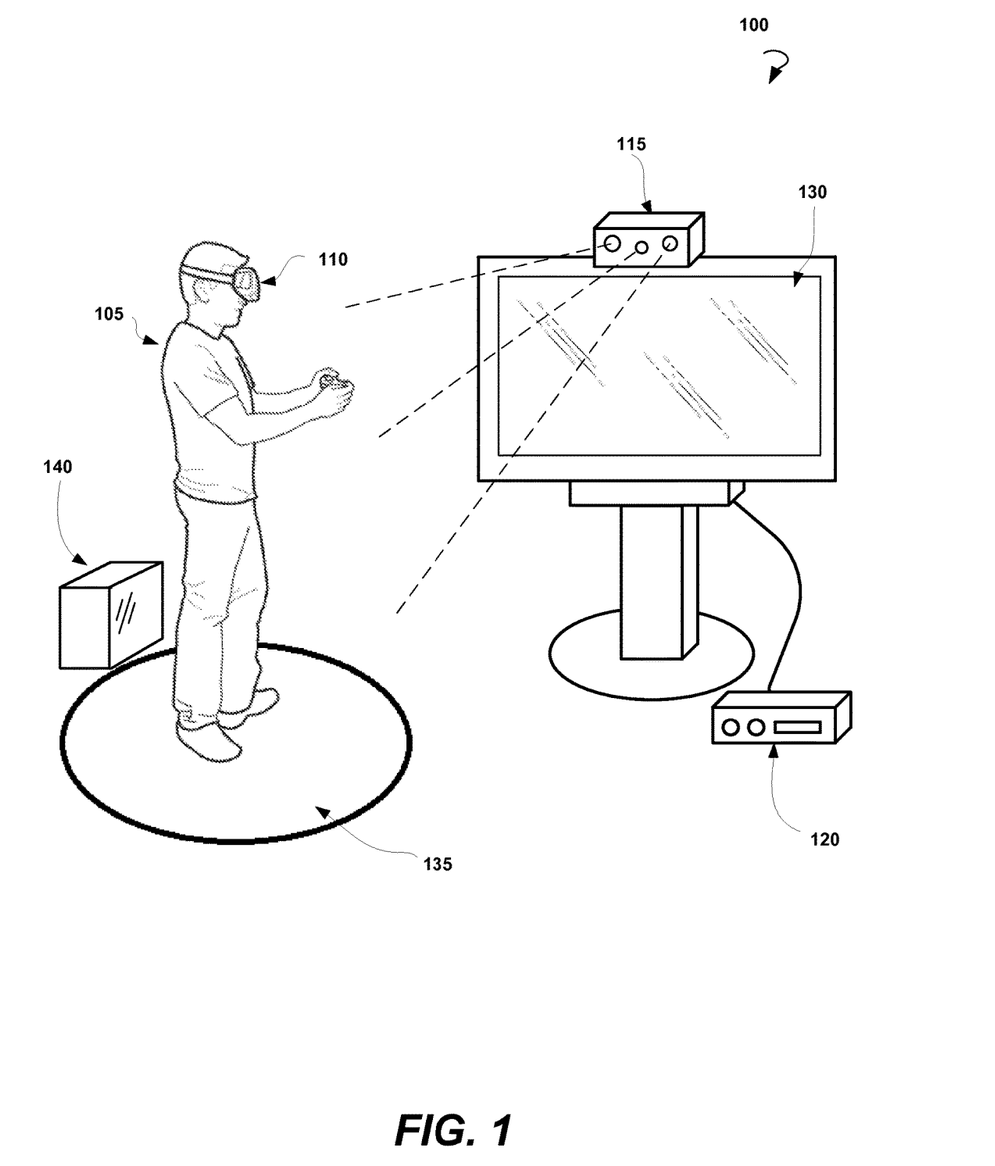
FIG. 1 is an example scene suitable for implementation of various aspects of the present technology, in accordance with an embodiment of the disclosure.

With reference now to the drawings, FIG. 1 is an example scene 100 suitable for implementation of various aspects of the present technology, in accordance with an embodiment of the disclosure.

In particular, there is shown a user 105 wearing a head mounted display 110. The user 105 is present in a 3D space being in front of a control device 115 which includes a depth sensor and/or image sensor so that the user 105 can be easily tracked. The control device 115 is coupled to or is a part of a gaming device 120, and can be also in operative communication with the head mounted display 110 and some other peripheral devices such as a TV display 130, audio system, etc.

In order to be tracked by the control device 115, the user 105 shall be present within the field of view of the depth sensor and/or image sensor of the control device 115, which area is also referred to herein as a "scene" 135. If the user 105 moves out of the scene 135, he would not be tracked and thus his interaction with the control device 115 is interrupted. Alternatively, the user 105 can move towards a tangible obstacle 140 such as a table, chair, toy, and so forth. Because the user 105 may not see the real world or have a diminished view of the real world while wearing the head mounted display 110, he may hit the obstacle 140 and get an injury. Accordingly, the present technology is directed to warn the user 105 if he approaches an edge of scene 135 or one or more obstacles 140.

Figure 2:
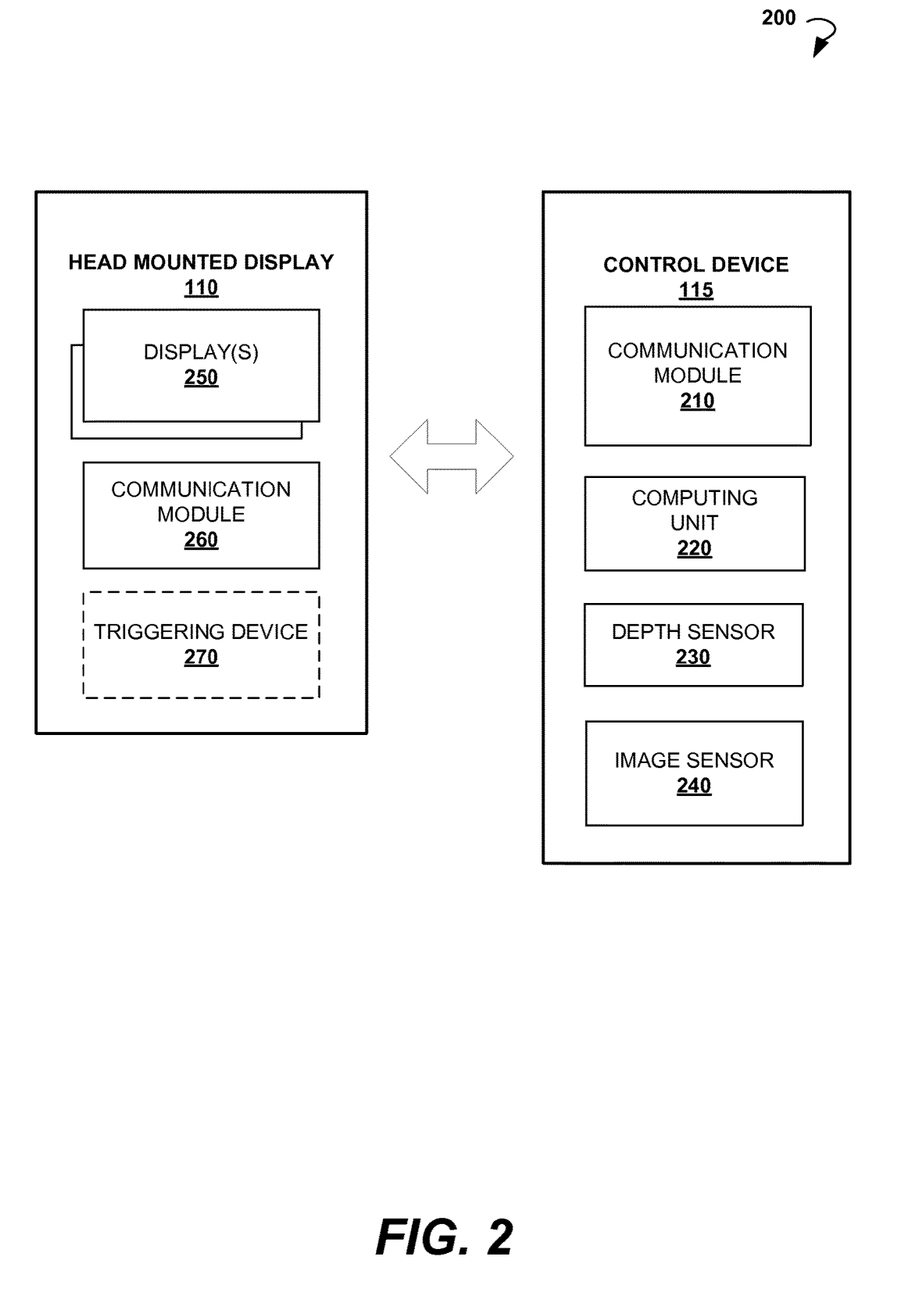
FIG. 2 is an example system suitable for employing methods for cautioning a user of a head mounted display, in accordance with an embodiment of the disclosure.

FIG. 2 is an example system 200 suitable for employing methods for cautioning a user of a head mounted display, in accordance with an embodiment of the disclosure.

As shown in FIG. 2, the system 200 includes a head mounted display 110 and a control device 115. The head mounted display comprises one or more displays 250, a communication module 260, and, optionally, a triggering device 270.

In certain embodiments, the display 250 is arranged in front of the one or two user eyes. The display 250 is configured to simulate virtual reality including video games, sport training, entertainment applications, and so forth. In one example embodiment, the display 250 is configured to render three-dimensional (3D) virtual game worlds. The user is able to change a displayable view within the virtual world by turning his head.

In certain example embodiments, the communication module 260 is configured to operatively communicate with the control device 115, and some other peripheral devices such as a TV display 130, audio system, and so forth.

In certain example embodiments, the triggering device 270 is configured to trigger a warning signal sent by the control device 115 to the head mounted display. For example, the triggering device 270 can initiate a display of a displayable image on the display 250 or the fading of brightness of images displayable by the head mounted display to the user. In one example embodiment, the triggering device 270 stops displaying images by the head mounted device. In another example embodiment, the triggering device 270 moves at least one display 250 of the head mounted display 110 away from eyes of the user.

In some example embodiments, the control device 115 comprises a communication module 210, a computing unit 220, a depth sensor 230, and an image sensor 240. The communication module 210 is configured to operatively communicate with the communication module 260 of the head mounted display 110 and other peripheral devices such as a TV display 130, audio system, and so forth.

In certain embodiments, the communication module 210 is configured to transmit images of a scene captured by the depth sensor 230 and/or the image sensor 240 to the computing unit 220. In certain embodiments, the computing unit 220 is configured to process images of the scene received from the depth sensor 230 and/or the image sensor 240, track the location of the user based on the received images and determine that the user approaches an edge of the scene. The computing unit 220 is further configured to send warning messages to the head mounted display 110 about the proximity of the scene edge.

In certain embodiments, the computing unit 220 sends triggering signals to the triggering device 270 based on the processed images of the scene. In certain embodiments, the depth sensor 230 captures video data in 3D under any ambient light conditions. The sensing range of the depth sensor 230 is adjustable and automatically calibrated based on the physical environment based on the presence or absence of furniture or other obstacles.

In certain embodiments, the image sensor 240 is a device that converts an optical image into an electronic signal. The image sensor 240 can include, for example, one or more video cameras that are sensitive to the visual range, IR cameras sensitive to one of the IR bands, UV cameras or other direct or indirect image-generating sensor systems, for example, radar or laser radar. Images from the depth sensor 230 and the image sensor 240 can be combined by data fusion and be displayed to the user.

Figure 3:
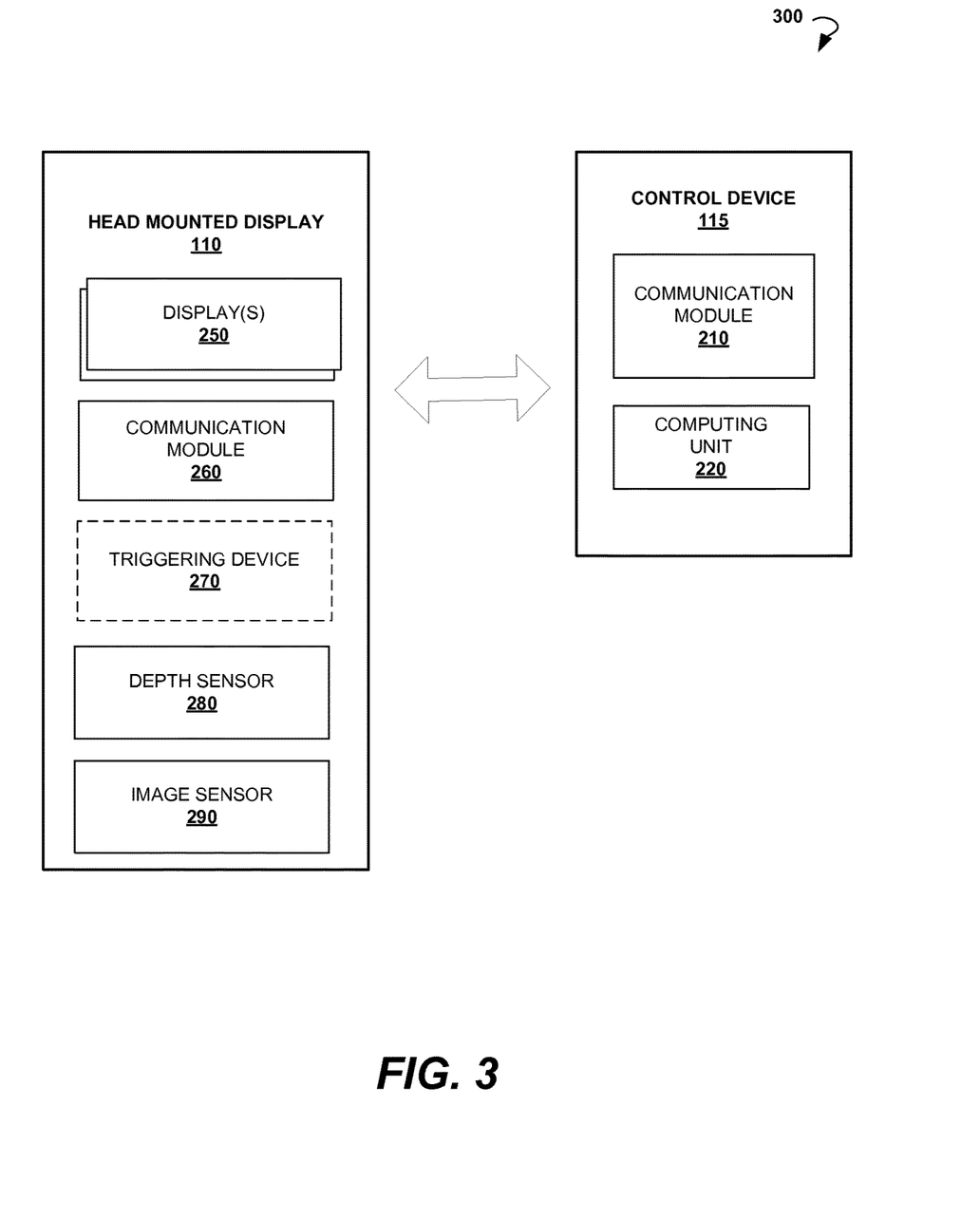
FIG. 3 is another example system suitable for employing methods for cautioning a user of a head mounted display, in accordance with an embodiment of the disclosure.

FIG. 3 is another example system 300 suitable for employing methods for cautioning a user of a head mounted display, in accordance with an embodiment of the disclosure. The system 300 is similar to the system 200 shown in FIG. 2, except that a depth sensor 280 and image sensor 290 are secured to the head mounted display 110.

Figure 4:
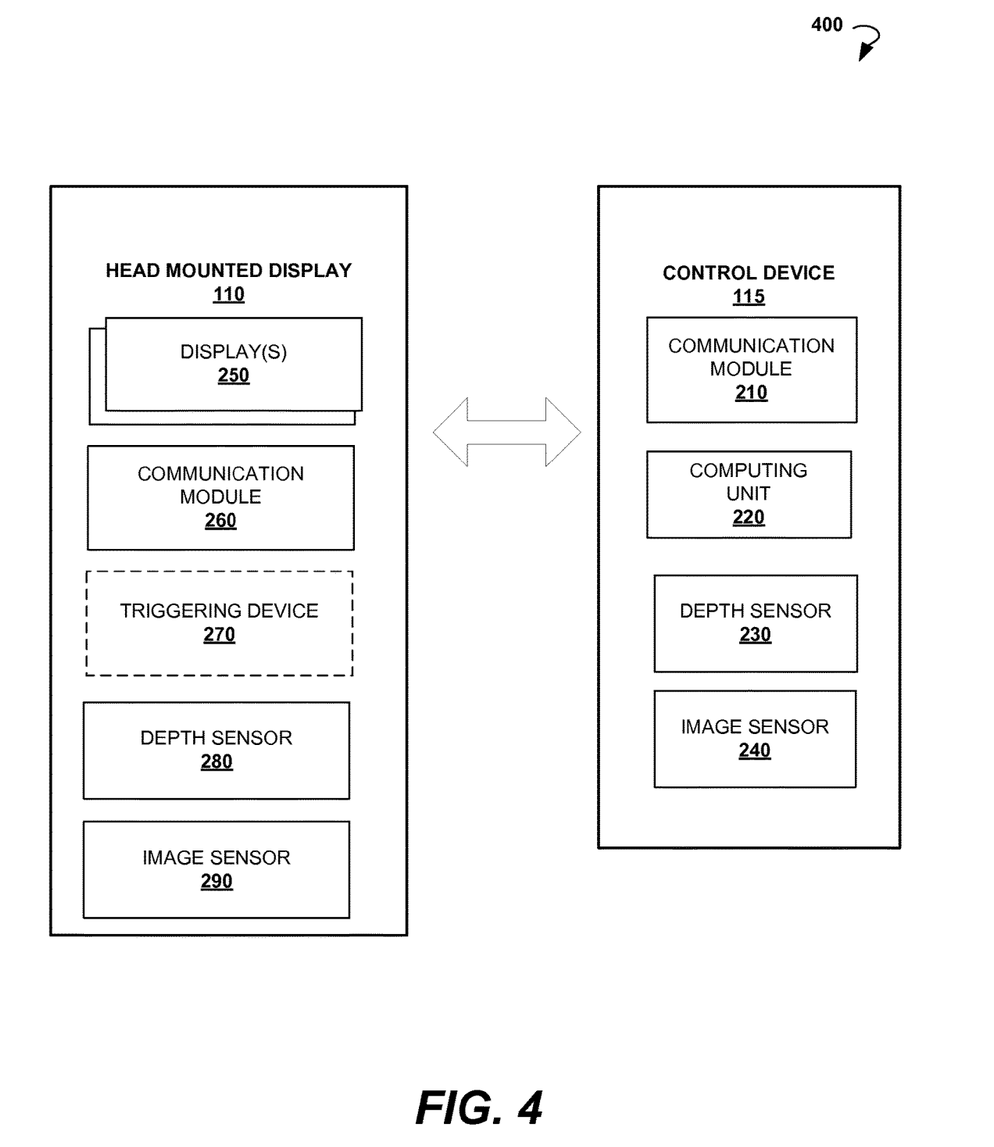
FIG. 4 is yet another example system suitable for employing methods for cautioning a user of a head mounted display, in accordance with an embodiment of the disclosure.

FIG. 4 is yet another example system 400 suitable for employing methods for cautioning a user of a head mounted display, in accordance with an embodiment of the disclosure. The system 400 is similar to the system 200 shown in FIG. 2, except that the head mounted display 110 includes both the depth sensor 280 and image sensor 290 and the control device 115 includes both the depth sensor 230 and the image sensor 240.

Figure 5:
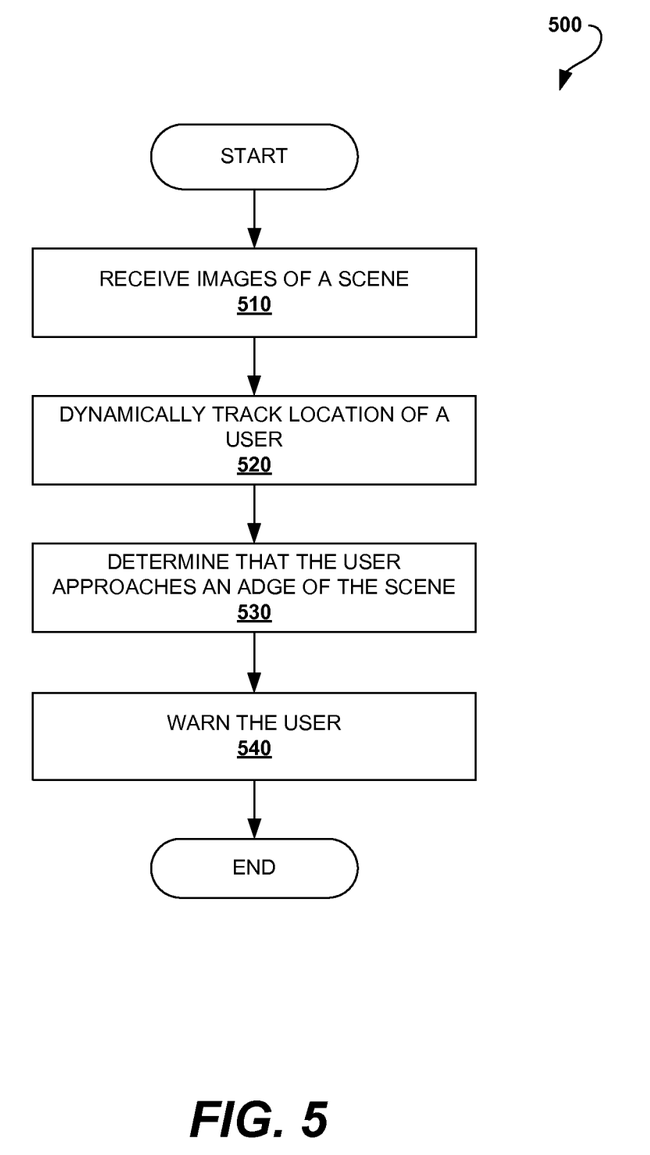
FIG. 5 is a process flow diagram showing a method for cautioning a user of a head mounted display, in accordance with an embodiment of the disclosure.

FIG. 5 is a process flow diagram showing a method 500 for cautioning a user of a head mounted display, in accordance with an embodiment of the disclosure.

The method 500 is performed by processing logic that includes hardware (e.g., dedicated logic, programmable logic, and microcode), software (such as software run on a general-purpose computer system or a dedicated machine), or a combination of both. In one example embodiment, the processing logic resides at the head mounted display. In another example embodiment, the processing logic resides at the control device. In yet another example embodiment, the processing logic resides at both the head mounted display and the control device.

As shown in FIG. 5, the method 500 can commence at operation 510 with receiving images and/or depth data of a scene, within which the user using a head mounted display, is present. The scene includes a predetermined three-dimensional area. The images of the scene are captured by one or more sensors, for example an image sensor or a depth sensor. Thus, the scene can be defined by a field of view of the one or more sensors. The one or more sensors can be coupled to the head mounted display. The head mounted display is a wearable computer with a display, a head mounted electronic device, a head-coupled display, a helmet-mounted display, and so forth. Alternatively, the one or more sensors are coupled to the control device.

The method 500 proceeds with tracking, at operation 520, of location information of the user based at least in part on the images and/or depth data of the scene received from the one or more sensors. The method 500 further proceeds with dynamically determining, at operation 530, that the user approaches an edge of the scene. The determination is based at least in part on the tracking performed at operation 520. In one example embodiment, the edge of the scene includes one or more tangible obstacles, such as a coffee table, a chair, and so forth.

At operation 540, the user is warned that the user approaches the edge of the scene based on the determination performed at operation 530. The warning can include an audio message, a visible message, turning on light emitting diodes, gradual fading of images displayed on the head mounted display, blending displayed images in the real world view, vibrating the head mounted display, disengaging the head mounted display or parts thereof, moving the head mounted display away from the eyes of the user, and the like.

In one example embodiment, the method 500 further includes receiving secondary images of the scene from one or more secondary sensors. The one or more secondary sensors are coupled to the control device. In certain embodiments, the one or more secondary sensors track the location of the user based at least in part on the secondary images of the scene.

Figure 6:
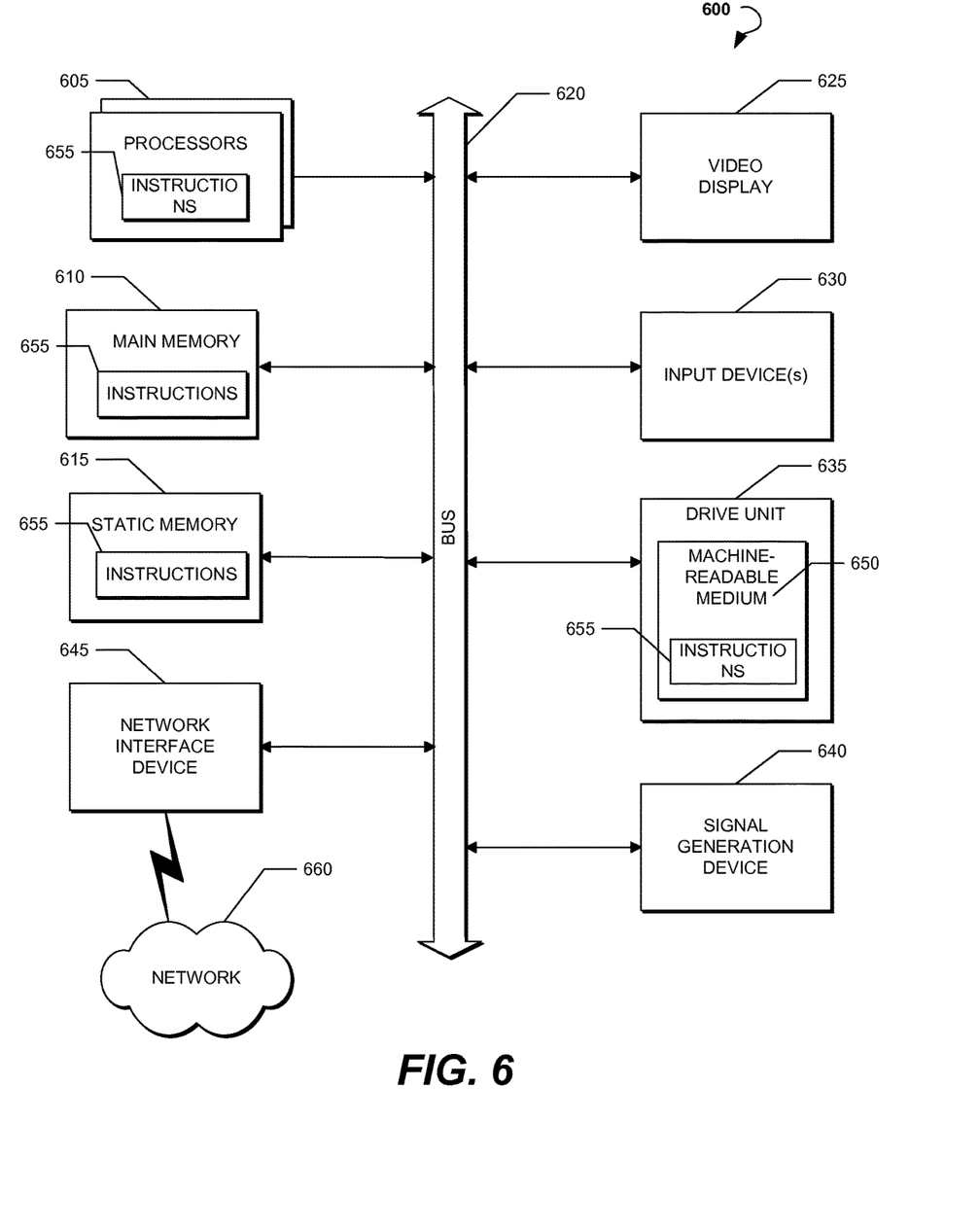
FIG. 6 is a diagrammatic representation of an example machine in the form of a computer system within which a set of instructions for the machine to perform any one or more of the methodologies discussed herein is executed.

FIG. 6 shows a diagrammatic representation of a computing device for a machine in the example electronic form of a computer system 600, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, set-top box (STB), PDA, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a LCD or a cathode ray tube (CRT)). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The disk drive unit 635 includes a computer-readable medium 650, which stores one or more sets of instructions and data structures (e.g., instructions 655) embodying or utilized by any one or more of the methodologies or functions described herein. The instructions 655 can also reside, completely or at least partially, within the main memory 610 and/or within the processors 605 during execution thereof by the computer system 600. The main memory 610 and the processors 605 also constitute machine-readable media.

The instructions 655 can further be transmitted or received over a communications network 660 via the network interface device 645 utilizing any one of a number of well-known transfer protocols (e.g., Hyper Text Transfer Protocol (HTTP), CAN, Serial, and Modbus). The communications network 660 includes the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications also includes links to any of a variety of wireless networks including WAP (Wireless Application Protocol), GPRS (General Packet Radio Service), GSM (Global System for Mobile Communication), CDMA (Code Division Multiple Access) or TDMA (Time Division Multiple Access), cellular phone networks, Global Positioning System (GPS), CDPD (cellular digital packet data), RIM (Research in Motion, Limited) duplex paging network, Bluetooth radio, or an IEEE 802.11-based radio frequency network.

While the machine-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for warning users of head mounted displays is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for cautioning a user of a head mounted display, the method comprising:
    receiving, by a processor, images of a scene of a physical environment within which the user wearing the head mounted display is present, wherein the scene includes a predetermined three-dimensional area in which the user is allowed to move around during use of the head mounted display;
    tracking, by the processor, location information of the head mounted display based at least in part on the images as the user moves around the physical environment;
    dynamically determining, by the processor, while content is presented on a screen of the head mounted display and the user is wearing the head mounted display, that the user is approaching an edge of the scene, the edge of the scene is defined by a boundary of the predetermined three-dimensional area; and
    based on the determination, warning, by the processor, the user via the head mounted display that the user wearing the head mounted display is approaching the edge of the scene.

2. The method of claim 1, wherein the warning includes a generated audio message or instructions to avoid moving toward the edge of the scene.

3. The method of claim 1, wherein the warning includes sending, by the processor, a displayable message to the screen of the head mounted display.

4. The method of claim 1, wherein the warning includes gradually fading-in an image of a tangible object present in the physical environment as the user wearing the head mounted display approaches closer to the tangible object, the fading-in is further configured to increase a brightness of the image of the tangible object as presented on the screen of the head mounted display while presenting the content on the head mounted display.

5. The method of claim 4, wherein the fading-in of the image of the tangible object is reversed to a fading-out of the image of the tangible object when the user wearing the head mounted display moves away from the tangible object present in the physical environment as the user approaches the edge of the scene.

6. The method of claim 1, wherein the warning includes stopping, by the processor, displaying of the content on the screen of the head mounted display when it is determined that the user wearing the head mounted display is approaching the edge of the scene.

7. The method of claim 1, wherein the warning includes gradually blending the content rendered on the screen of the head mounted display with an image of a tangible object from the physical environment, the blending assists in preventing the user from contacting the tangible object.

8. The method of claim 7, wherein the images of the scene include images in which the user is present, and the content rendered on the screen of the head mounted display include virtual reality (VR) media.

9. The method of claim 7, wherein images of the scene include images from a point of view of the user wearing the head mounted display.

10. The method of claim 1, wherein the scene is defined by a field of view of at least one image sensor or at least one depth sensor usable to determine when the user wearing the head mounted display is approaching the edge of the scene.

11. The method of claim 1, wherein the warning includes providing guiding instructions to direct the user back towards a center of the scene or a safe location within the predetermined three-dimensional area where the user can continue to interact with the content presented on the screen of the head mounted display, the content being virtual reality (VR) media.

12. A method for cautioning a user of a head mounted display, the method comprising:
    receiving, by a processor, images of a scene of a physical environment within which the user using the head mounted display is present, wherein the scene includes a predetermined three-dimensional area in which the user moves around during use of the head mounted display and wherein the images are captured by one or more sensors secured to the head mounted display;
    dynamically determining, by the processor, while content is presented on a screen of the head mounted display and the user is wearing the head mounted display, that the user is approaching one or more tangible obstacles in the physical environment based at least on the images, the determining includes analyzing the images to identify a boundary of the predetermined three-dimensional area and determining that the user is approaching the one or more tangible objects within the boundary; and
    based on the determination, warning, by the processor, the user via the head mounted display that the user wearing the head mounted display is approaching the one or more tangible obstacles.

13. The method of claim 12, wherein the one or more sensors include an image sensor.

14. The method of claim 12, wherein the one or more sensors include a depth sensor.

15. The method of claim 12, wherein the images include depth information of the scene.

16. The method of claim 12, further comprising receiving, by the processor, secondary images of the scene from one or more secondary sensors arranged external to the head mounted display, the secondary images capturing the user within the scene of the physical environment.

17. The method of claim 16, wherein the determining that the user is approaching one or more tangible obstacles is further based at least on evaluating the secondary images.

18. The method of claim 12, wherein the one or more tangible obstacles are present within the physical environment at an edge of the scene.

19. The method of claim 12, wherein the one or more tangible obstacles at least partially define an edge of the scene where the user is considered safe during interaction with content provided to the screen of the head mounted display, the content being virtual reality (VR) media.

20. A method for cautioning a user of a head mounted display, the method comprising:

receiving, by a processor, depth data of a scene of a physical environment within which the user using the head mounted display is present, wherein the scene includes a predetermined three-dimensional area in which the user moves around during use of the head mounted display and wherein the depth data is captured by one or more depth sensors secured to the head mounted display;

dynamically determining, by the processor, while content is presented on a screen of the head mounted display and the user is wearing the head mounted display that the user is approaching one or more tangible obstacles present within a boundary of the predetermined three-dimensional area as the user moves around the physical environment, based at least on the depth data; and based on the determination, warning, by the processor, the user via the head mounted display that the user wearing the head mounted display is approaching the one or more tangible obstacles.

* * * * *